Feb. 3, 1925.
H. C. EGERTON
PHONOGRAPHIC APPARATUS
Filed Jan. 10, 1920
1,524,697
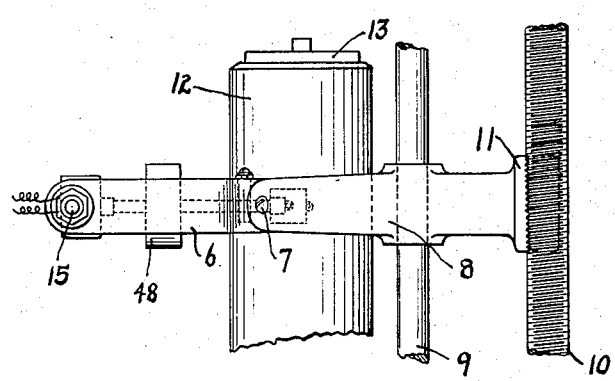
Fig. 1.
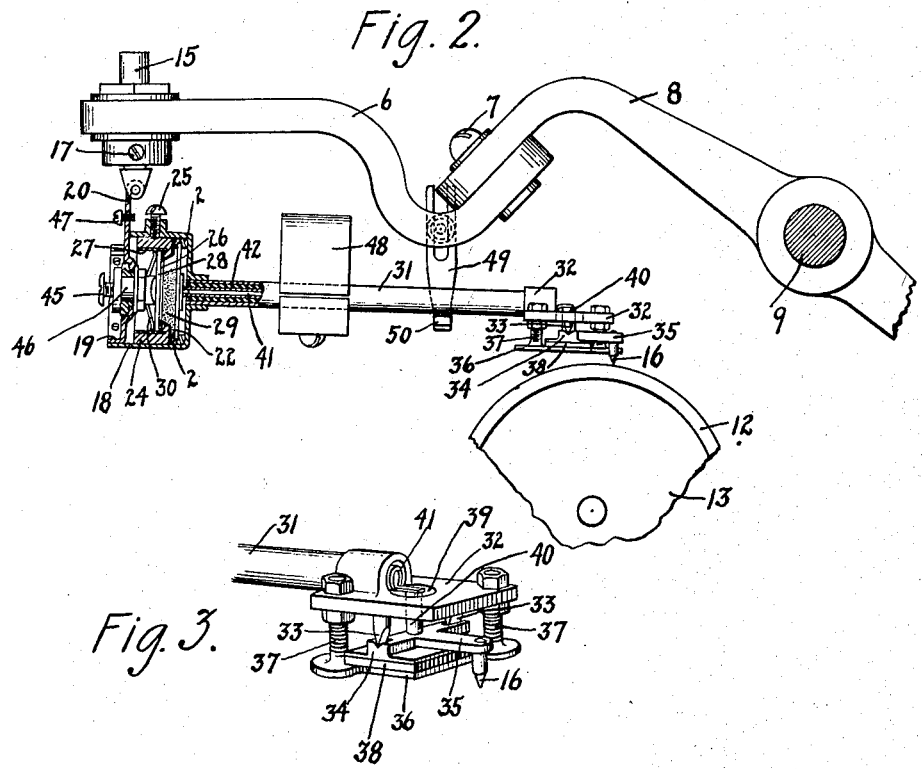
Inventor:
Henry C. Egerton
by Joel C. R. Palmer
Att'y.

Patented Feb. 3, 1925.

1,524,697

UNITED STATES PATENT OFFICE.

HENRY C. EGERTON, OF BERGEN, NEW JERSEY, ASSIGNOR TO WESTERN ELECTRIC COMPANY, INCORPORATED, OF NEW YORK, N. Y., A CORPORATION OF NEW YORK.

PHONOGRAPHIC APPARATUS.

Application filed January 10, 1920. Serial No. 350,616.

*To all whom it may concern:*

Be it known that I, HENRY C. EGERTON, a citizen of the United States, residing at Ridgewood, in the county of Bergen and State of New Jersey, have invented certain new and useful Improvements in Phonographic Apparatus, of which the following is a full, clear, concise, and exact description.

This invention relates to phonographic apparatus and more particularly to recording and reproducing apparatus.

The object of the invention is a simple and efficient structure for transmitting vibrations between a stylus member and an operating or operated member, depending on whether the apparatus is for recording or reproducing. The invention provides a translating device which comprises an element relatively inflexible longitudinally, but comparatively flexible transversely connecting the stylus and the operating member or operated member, together with a member of energy-absorbing material engaging the translating element at the side thereof, to resist and to dissipate transverse vibrations of such element. One embodiment of the invention is illustrated in the drawing wherein Fig. 1 is a plan view of such embodiment as applied to a cylinder type phonograph; Fig. 2 is a side elevation of the device on a larger scale and partially in section; while Fig. 3 is an enlarged detailed view illustrating the method of associating the stylus with the translating element.

The particular device shown comprises an arm 6 secured by a bolt 7 to a bracket 8, slidably mounted on a shaft 9 and moved along this shaft in response to the rotation of the usual phonograph feed screw 10 in engagement with a threaded portion 11 of the bracket 8. A record 12 is mounted upon a mandrel 13 and the relative rotation of the feed screw 10 and the mandrel 13 is such that the telephonic reproducer is moved along longitudinally of the record 12 during reproduction at the proper rate to accurately follow the spiral cut on the record.

The particular reproducing device shown has a post 15 vertically adjustable relative to the arm 6 which enables the device to be positioned to obtain a proper angle of engagement of the stylus 16 with relation to the surface of the record 12. A set screw 17 serves to hold the post 15 in its adjusted position and the reproducer as a whole, is hinged to the lower end of the post 15 so as to rest freely on the record 12 and to accurately follow the trace thereof. The weight of the reproducer is thus distributed between the post 15 and the surface of the record 12.

The reproducer proper includes a cup-shaped casing 18, the open end of which is closed by a cap 19 secured thereto, which cap has an upward extension 20 pivotally secured to the post 15 and forming therewith a hinged mounting for the reproducer. A pair of felt rings 2 are positioned at the bottom of the casing 18 and a movable electrode 22 is held between these rings and out of contact with the casing 18 and also out of contact with the tubular member 24. The tubular member 24 is carried within the casing 18 and held against the left-hand ring 2 by means of a set screw 25. The member 24 is provided with an internal shoulder, and rings 26 and 27 of insulating material separate a second electrode 28 therefrom. A chamber is thus provided between the two electrodes 22 and 28 which contains carbon granules 29, and the portion of the member 24 within this chamber is covered with insulating material, so that all the current will pass between the electrodes 22 and 28. A spring 30 presses against the rear of the electrode 28 to hold it firmly against the ring 26 which in turn rests against the internal shoulder of member 24. The two electrodes 22 and 28 together with the granular carbon particles 29 cooperate together to provide a variable resistance element suitable for the reproduction of telephonic currents.

The right-hand end of the casing 18 is axially perforated to receive a relatively rigid tube 31, coaxial with and secured at one end to the casing 18. A supporting plate 32 is mounted on the other end of the tube 31 and is provided with a pair of knife edges 33 upon which is pivoted a rocking member 34 having an extension 35 in which the stylus 16 is mounted. A clamping plate 36 is adjustably secured to the plate 32 by bolts 37 and engages a sheet 38 of resilient material co-extensive with the base of the member 34 and located between such base and plate. The sheet 38 tends to return the member 34 to its balanced position upon movement of such member under the influence of the stylus 16. The plate 32 has an opening 39 therein through which a rigid post 40 secured to the member 34 and movable thereby, is free to move during the operation of the device, without engaging the plate 32. The upper end of the post 40 is firmly secured to one end of a translating member 41, preferably of foil in tubular form, arranged for longitudinal movement within the tube 31 and having its other end fastened to the electrode 22 to effect movements thereof corresponding to those given to the stylus 16 by variations in the depth of the record traces being reproduced from the record 12. Surrounding the tubular member 41 and filling the space between this member and the enclosing tube 31 is a tube 42 of energy-absorbing material such for example as soft rubber which resists transverse vibrations of the tube 41, and thus dissipates the energy thereof to such a great extent that such transverse vibrations as may be transmitted to the tube 41 from the stylus 16 will be practically eleminated before reaching the electrode 22. The longitudinal vibrations imparted to the tube 41 are, however, efficiently transmitted to the electrode 22 since the tube 41 while relatively flexible transversely, is relatively inflexible longitudinally, and inasmuch as the energy-absorbing material 42 does not substantially effect transmission of longitudinal vibrations by such tube.

From the above description it will be apparent that variable movements imparted to the stylus by the variations in depth of cut in the record groove will be transmitted through the medium of extension 35 and post 40 to the tube 41 and produce corresponding longitudinal movements of this tube. These impart like movements to the electrode 22 which, with the electrode 28 and the carbon filling 29, constitute a variable resistance element corresponding, in general, to that used in a telephone transmitter, which element operates in the same manner to produce fluctuating telephone currents in a circuit wherein such element is connected. Such current can be utilized with suitable telephonic apparatus to audibly reproduce sounds agreeing with those originally recorded upon the record.

A screw 45 serving as a binding post is electrically associated with the electrode 28 through the medium of a conducting member 46 supported by the cap 19 but insulated therefrom; one end of this member engaging the spring 30 and the other being threaded for the screw 45. Another screw 47 serving as the other binding post is carried by the extension 20 and electrically associated with the electrode 22. The electrical circuit within the device extends from screw 45 through member 46, spring 30, electrode 28, granules 29, electrode 22, tube 41, post 40, rocking member 34, knife edges 33, plate 32, tube 31, casing 18, cap 19 and extension 20, to the screw 47.

The weight of the portion of the device hinged to the post 15 is distributed between this post and the record 12 during normal operation. The weight carried by the record through the bearing of the stylus 16 thereon should be such that the latter will accurately follow the variations in the record trace. The weight 48 adjustable longitudinally of the tube 31, allows the pressure between the stylus and record to be regulated so as to obtain that best suited to the operation of the device.

A bracket 49 having a horizontal portion 50 is supported by and vertically adjustable relative to the arm 6. The portion 50 extends beneath tube 31, but while out of contact therewith during the normal operation of the tube, it limits the downward movement thereof and prevents the stylus 16 striking the mandrel 13 and injuring the stylus at times when there is no record on the mandrel.

The feature of encasing a translating element relatively inflexible longitudinally while comparatively flexible transversely, within a casing of energy-absorbing material engaging the sides of the element to absorb the transverse vibrations of such element, is applicable to situations where the translating member transmits its vibrations in a straight line from one member to the other, and also to situations where these members are out of alignment; the translating member in the latter case being curved or bent instead of straight as shown in the drawing.

The translating member 41 while preferably of tubular construction in the particular embodiment of the invention illustrated, may also be formed from a solid rod and such a construction is considered to be within the scope of the present invention.

What is claimed is:

1. A phonographic device comprising a phonographic record, a stylus to engage therewith, a movable member spaced from the stylus, an element relatively inflexible longitudinally but relatively flexible transversely extending longitudinally between and mechanically associated with the stylus and movable member to translate movement therebetween, a support for said element, and means comprising energy absorbing material between said element and said support to resist and dissipate the transverse vibrations of the element.

2. A phonographic device comprising a phonographic record, a stylus to engage therewith, a movable member spaced from the stylus, a tubular element relatively inflexible longitudinally but relatively flexible transversely extending longitudinally between and mechanically associated with the stylus and movable member to translate movement therebetween, supporting means for said element, energy absorbing material intermediate the element and said supporting means, engaging the sides of the element and said supporting means, to resist and dissipate only the transverse vibrations of the element.

3. A phonographic device comprising a phonographic record, a stylus to engage therewith, a movable member spaced from the stylus, an element relatively inflexible longitudinally but relatively flexible transversely extending longitudinally between and mechanically associated with the stylus and movable member to translate movement therebetween, a casing spaced from and enclosing the element, and a member of energy absorbing material intermediate the element and casing engaging the side of the element and the interior of the casing to resist and to dissipate transverse vibrations of the element.

In witness whereof, I hereunto subscribe my name.

HENRY C. EGERTON.